US008684364B2

(12) United States Patent
Han

(10) Patent No.: US 8,684,364 B2
(45) Date of Patent: *Apr. 1, 2014

(54) POSITIVE RELEASE COLLET

(76) Inventor: Sil Han, Des Plaines, IL (US)

(*) Notice: Subject to any disclaimer, the term of this patent is extended or adjusted under 35 U.S.C. 154(b) by 1137 days.

This patent is subject to a terminal disclaimer.

(21) Appl. No.: 11/972,505

(22) Filed: Jan. 10, 2008

(65) Prior Publication Data

US 2008/0169618 A1    Jul. 17, 2008

Related U.S. Application Data

(60) Provisional application No. 60/884,697, filed on Jan. 12, 2007.

(51) Int. Cl.
*B23B 31/40* (2006.01)

(52) U.S. Cl.
USPC .......... 279/2.03; 279/2.12; 279/46.4

(58) Field of Classification Search
CPC .... B23B 31/404; B23B 31/40; B23B 31/4033
USPC .............. 279/2.12, 2.02–2.04, 46.4
See application file for complete search history.

(56) References Cited

U.S. PATENT DOCUMENTS

| | | | | | |
|---|---|---|---|---|---|
| 4,416,459 | A | * | 11/1983 | Morawski et al. | 279/2.04 |
| 5,133,565 | A | * | 7/1992 | Schmidt | 279/2.04 |
| RE37,397 | E | * | 10/2001 | Lloyd | 279/2.03 |
| 6,419,430 | B2 | * | 7/2002 | Hangleiter | 409/233 |
| 6,568,888 | B2 | * | 5/2003 | Hangleiter | 409/233 |
| 6,568,889 | B2 | * | 5/2003 | Rohm | 409/233 |
| 6,862,785 | B2 | * | 3/2005 | Baumgartner | 29/26 A |
| 6,883,407 | B2 | * | 4/2005 | Smith et al. | 82/124 |

* cited by examiner

*Primary Examiner* — Eric A Gates
*Assistant Examiner* — Bayan Salone
(74) *Attorney, Agent, or Firm* — Leighton K. Chong

(57) ABSTRACT

An arbor of a machine tool has a collet arbor base, an expandable and releasable collet having a top band coupled to a bottom band, an actuator pin slidable from the collet arbor base arranged concentrically within the collet and having a reverse male taper on an upper end thereof that actuates the top band of the collet, and a conical ring with a taper angle matching the upper end of the actuator pin arranged proximate a lower part of the actuator pin concentric therewith, wherein the reverse male taper at the upper end of the actuator pin activating the top band and the conical ring having a matching taper activating the bottom band of the collet cause the collet to expand and retract accordingly.

2 Claims, 1 Drawing Sheet

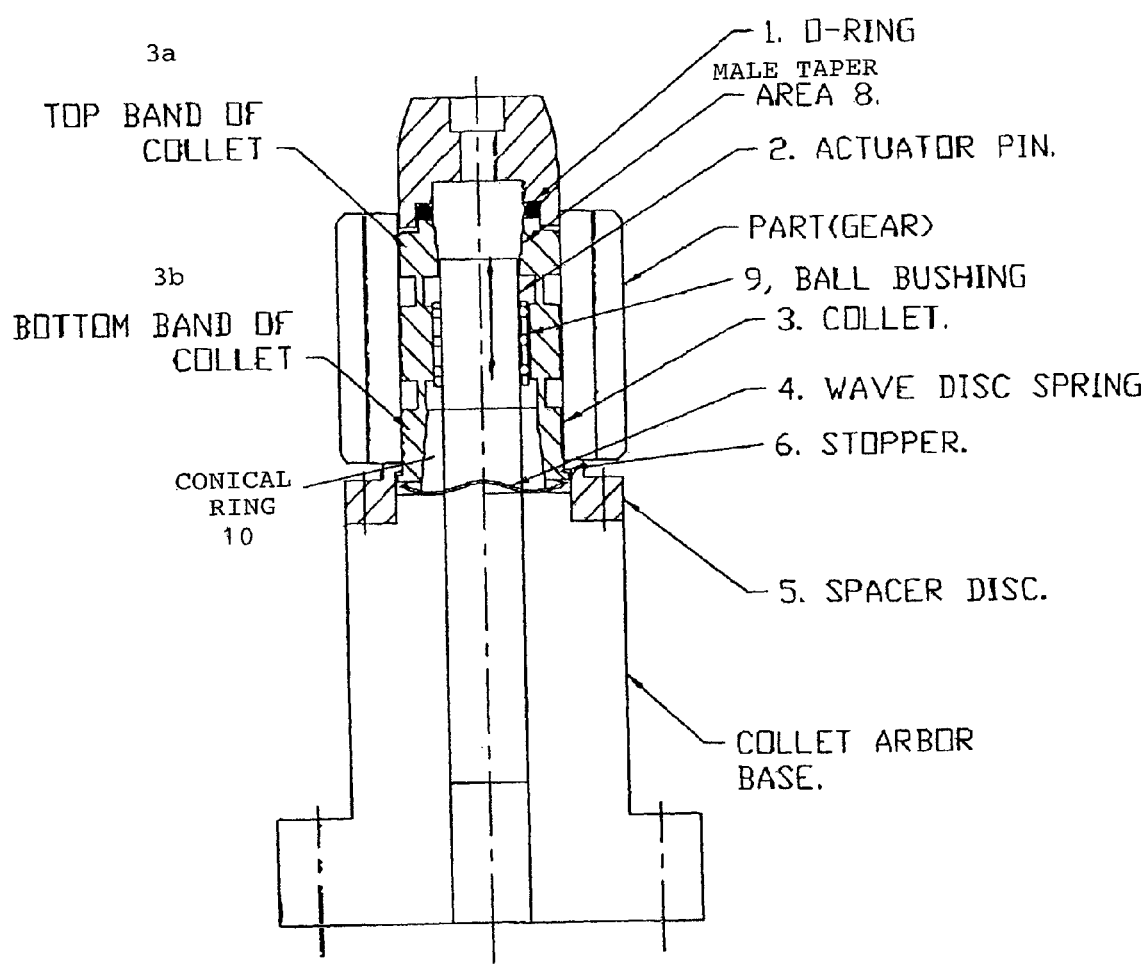

POSITIVE RELEASE COLLET

This U.S. patent application claims the priority filing date of U.S. Provisional Application 60/884,697 filed on Jan. 12, 2007, of the same title and by the same inventor in the present application.

FIELD OF INVENTION

This invention relates to an arbor of a machine tool, and particularly to an improvement that allows a collet to be easily separated from a subject gear.

BACKGROUND OF INVENTION

In the gear inspection process, subject gears must be held tightly in place on an arbor assembly. The arbors that exist today do not release the subject gear easily because of the reverse-taper principle inherent in the expanding collet design in which, two opposing female tapers are wedged open by externally applied opposing male tapers. The small angle of the female tapers, which are necessary to create large outwardly-directed radial forces, hold the subject gears inside diameters securely but tend to lock into the matching male tapers much like a Morse or Brown and Sharpe taper. As a result, the subject gear and expanding collet are not easily separated. Quick separation, without the use of external dislodging means, is necessary to make the inspection process more efficient.

SUMMARY OF INVENTION

In accordance with the present invention, an arbor of a machine tool has a collet arbor base, an expandable and releasable collet having a top band coupled to a bottom band, an actuator pin slidable from the collet arbor base arranged concentrically within the collet and having a reverse male taper on an upper end thereof that actuates the top band of the collet, and a conical ring with a taper angle matching the upper end of the actuator pin arranged proximate a lower part of the actuator pin concentric therewith, wherein the reverse male taper at the upper end of the actuator pin activating the top band and the conical ring having a matching taper activating the bottom band of the collet cause the collet to expand and retract accordingly.

In a preferred embodiment, a spring is provided on an upper surface of the collet arbor base and pushes against a lower end of the bottom band of the collet to bias it to the release position, and a spacer disc mounted on the upper surface of the collet arbor base has a retentive flange that is used to stop the upward movement of the bottom band of the collet by a stopper lip thereof. When the actuator pin is displaced axially toward the top end, the reverse male taper releases from the upper band of the collet, and the bottom band is spring-biased to slide upward along the taper of the conical ring to the release postion, and when the actuator pin is displaced axially toward the bottom end, the reverse male taper of the upper end of the actuator pin pushes the upper band downward to expand it outward, while the bottom band expands outward on the matching taper of the conical ring. The conical ring has a larger root diameter than the root diameter of the taper and does not lock onto the inside of the collet's bottom band. As a result, the subject gear and expanding collet are easily separated.

Other objects, features, and advantages of the present invention will be explained in the following detailed description of the invention having reference to the appended drawing.

BRIEF DESCRIPTION OF DRAWINGS

FIG. 1 shows a preferred embodiment of a positive release collet for an arbor in accordance with the invention.

DETAILED DESCRIPTION OF INVENTION

A preferred embodiment of the invention is illustrated in FIG. 1, and will now be described in detail. A typical inspection arbor consists of a collet arbor base that is mounted to a much larger fixture. An actuator pin 2 is movable axially within the collet arbor base (bidirectionally as indicated by the two-headed arrows). The actuator pin 2 is elongated and provided with a reverse low-angle male taper area 8 on its upper end, which is fastened to a truncated bullet-shaped body at the top end of arbor to ease the entry of a subject gear or workpiece part thereon. The reverse taper at the upper end of the actuator pin 2 actuates the upper band 3a of the expanding collet 3.

A conical ring 10 with matching taper angle to the upper end of the actuator pin 2 is arranged concentric with the actuator pin and positioned on a spacer disc 5 at the lower end of the collet. The conical ring 10, which has a larger root diameter than the root diameter of the taper on the actuator pin 2, slides on the actuator pin to actuate the bottom band 3b of the expanding collet. To prevent the locking issues described earlier, a wave disc spring 4 rests on an upper surface of the collet arbor base and pushes against the lower end of the bottom band 3b of the collet, tending to push it upward to the release position. The spacer disc 5 has a retentive flange that is used to stop the upward movement of the collet by the stopper lip 6 which defines the upper end of release movement of the collet 3. A precision ball bushing 9 allows for friction-free movement of the collet 3 relative to the actuator pin 2 while maintaining concentricity between the actuator pin and collet. The lower band of the expanding collet does not lock onto the gear, nor does the larger root diameter of the free conical ring lock onto the inside of the collet's lower band.

In this embodiment, it can be seen from the drawing that the collet axial movement is limited to that allowed by the wave spring flexibility in the downward direction, and no movement in the vertical direction. Further, it can be seen that the upward displacement of the actuator pin 2 will cause a positive disengagement of the upper conical wedges. This in turn will cause release of the collet and disengagement of the subject gear.

As a result when the actuator pin 2 is displaced axially toward the top end, the reverse male taper releases from the upper band 3a of the collet 3, and the bottom band 3b is spring-biased to slide upward along the taper of the conical ring 10. When the actuator pin 2 is displaced axially toward the bottom, the reverse male taper pushes the upper band 3a downward until it reaches bottom then expands it outward, while the bottom band 3b is also moved downward and expands outward on the matching taper of the conical ring 10. Thus, the two tapers, one at the upper end activating the top band 3a of the collet and one activating the bottom band 3b of the collet, will cause the collet 3 to expand and retract accordingly.

As discussed earlier, the current art does not allow for quick release of subject gears when the male tapers are drawn apart. The geometry causes one of the female tapers on the collet to stay locked onto a male taper keeping the collet's corresponding expanding band to, accordingly, lock onto the subject gear.

To provide greater disengagement forces, polymeric and rubber bands in the form of o-rings have been used between the nosepiece and the upper peripheral edge of the collet. An o-ring 1 is shown positioned between the upper end of the collet and the truncated bullet-shaped body of the arbor. These bands also served the purpose of blocking the entry of dirt, debris, and other unwanted material from entering the bearing cavities. A further enhancement to the augment the separation force could be the addition of wave springs on the top end of the collet. A combination of bands and springs at both ends of the collet can also be used successfully.

It is understood that many modifications and variations may be devised given the above description of the principles of the invention. It is intended that all such modifications and variations be considered as within the spirit and scope of this invention, as defined in the following claims.

The invention claimed is:

1. An arbor of a machine tool comprising:
   a collet arbor base,
   an expandable and releasable collet for engaging and releasing from a subject gear, said collet having a top band coupled over a length of the collet to a bottom band thereof,
   an actuator pin slidable upward and downward from the collet arbor base arranged concentrically within the collet and having a reverse male taper on an upper end thereof that actuates the top band of the collet,
   a conical ring having a larger root diameter tapering to a smaller ring diameter with a taper angle matching the upper end of the actuator pin arranged proximate a lower part of the actuator pin concentrically therewith for actuating the bottom band of the collet,
   a spring provided on an upper surface of the collet arbor base and configured to push against a lower end of the bottom band of the collet to bias it for an elastic anti-backlash movement,
   a spacer disc mounted on an upper surface of the collet arbor base having a retentive flange that is used to stop upward movement of the collet by a stopper lip thereof which defines the upper limit of release movement of the collet while allowing elements of the bottom band of the expanding collet to move radially and perpendicularly with respect to the arbor thereby preventing the bottom band from locking onto the subject gear or the larger root diameter of the conical ring inside the collet's bottom band,
   wherein when the actuator pin is displaced axially downward, the reverse male taper of the upper end of the actuator pin pushes the top band downward to expand it outward, while the bottom band expands outward when the collet is pushed by the actuator pin's downward displacement on the matching taper of the conical ring, and
   wherein when the actuator pin is displaced axially upward, the reverse male taper positively releases from the top band of the collet, and the bottom band of the collet is positively released from the taper of the conical ring,
   whereby movement of the actuator pin axially upward and downward causes the collet to positively expand and retract accordingly, and in its positive retraction ensure positive release of the collet from keeping locked onto a subject gear.

2. An arbor according to claim 1, wherein the conical ring has a larger root diameter than a root diameter of the reverse male taper, and the larger root diameter of the conical ring does not lock onto the inside of the collet's bottom band and, as a result, a subject gear and the collet are easily separated.

* * * * *